Jan. 17, 1956 A. C. McELWAIN ET AL 2,730,915

DISK SHARPENER

Filed April 20, 1953 2 Sheets-Sheet 1

INVENTORS.
ALAN C. McELWAIN
DONALD F. LINK
BY
John H. Widdowson
ATTORNEY

Jan. 17, 1956 A. C. McELWAIN ET AL 2,730,915
DISK SHARPENER
Filed April 20, 1953 2 Sheets-Sheet 2

INVENTORS.
ALAN C. McELWAIN
DONALD F. LINK
BY
John H. Widdowson
ATTORNEY

United States Patent Office 2,730,915

Patented Jan. 17, 1956

2,730,915

DISK SHARPENER

Alan C. McElwain, Mullinville, and Donald F. Link, Wichita, Kans.

Application April 20, 1953, Serial No. 349,739

5 Claims. (Cl. 76—89.2)

This invention relates to means for sharpening disks. In a more specific aspect it relates to portable means for sharpening disks of disk tillers. In a still more specific aspect this invention relates to portable means for sharpening the edge of a disk of a disk tiller by rolling same while said disk remains mounted on the disk tiller.

Means for sharpening the disks of disk tillers are known in the prior art. Apparatus which cuts away a portion of the disk to sharpen the edge of same is known, and apparatus which grinds the edge of the disk to sharpen same is known in the prior art. These types of apparatus have the distinct disadvantage that in the sharpening operation they destroy a portion of the disk, that is cut away a portion of the disk, resulting in a relatively short life for a set of disks for a disk tiller. Apparatus is known which rolls the edge of the disk to sharpen same but such is very inconvenient to use, cumbersome and very inexacting in the disk sharpening operation, mainly because the rollers are powered to roll out the edge of the disk. Apparatus of the prior art separately mounts for sharpening the disk assembly of the disk tillers, requiring dismantling the disk tillers. This is very time consuming and uneconomical.

We have invented new portable disk sharpening apparatus which is particularly advantageously used to sharpen by rolling the disks of disk tillers, such as disk plows, generally referred to as one-way plows, disk harrows, and the like. The disk sharpening apparatus of our invention comprises a carriage with a pair of idle swaging rollers mounted thereon. The rollers are adjustable and are mounted in a position so that the outer portion of a disk will pass therebetween. The disk is rotated in any suitable manner while mounted on the disk tiller. The carriage with the adjustable rollers mounted thereon is preferably removably mounted on a supporting member which is attached to a base, and the assembly of our invention can easily be taken to the disk tiller in the field and the disks sharpened by rolling on the site of tiller operation. The disk sharpening means of our invention has many advantages. It can easily be made portable so that the disks can be sharpened at the location of the disk tiller, and in addition, in sharpening disks with our apparatus, it is not necessary to remove them from the disk tiller. The device of our invention sharpens the disk without cutting away or grinding away any of the disk, and a set of disks will last a great deal longer if sharpened by the apparatus of our invention than if sharpened by the usual cutting or grinding means. The apparatus of our invention is easy and economical to build and operate, exacting in operation and gives excellent results in use.

It is an object of this invention to provide new disk sharpening means.

It is another object of this invention to provide new means for sharpening the disks of disk tillers.

It is a further object of this invention to provide new portable disk sharpening apparatus for sharpening the disks of disk tillers by rolling out the outer portion of the disk to a sharpened edge.

Other objects and advantages of the new disk sharpening apparatus of our invention will become apparent, to one skilled in the art, upon reading this disclosure.

Drawings accompany and are a part of this disclosure. Such drawings set forth preferred specific embodiments of the disk sharpening apparatus of our invention. However, it is to be understood that such drawings are not to unduly limit the scope of our invention.

Figures 1, 2, 3:
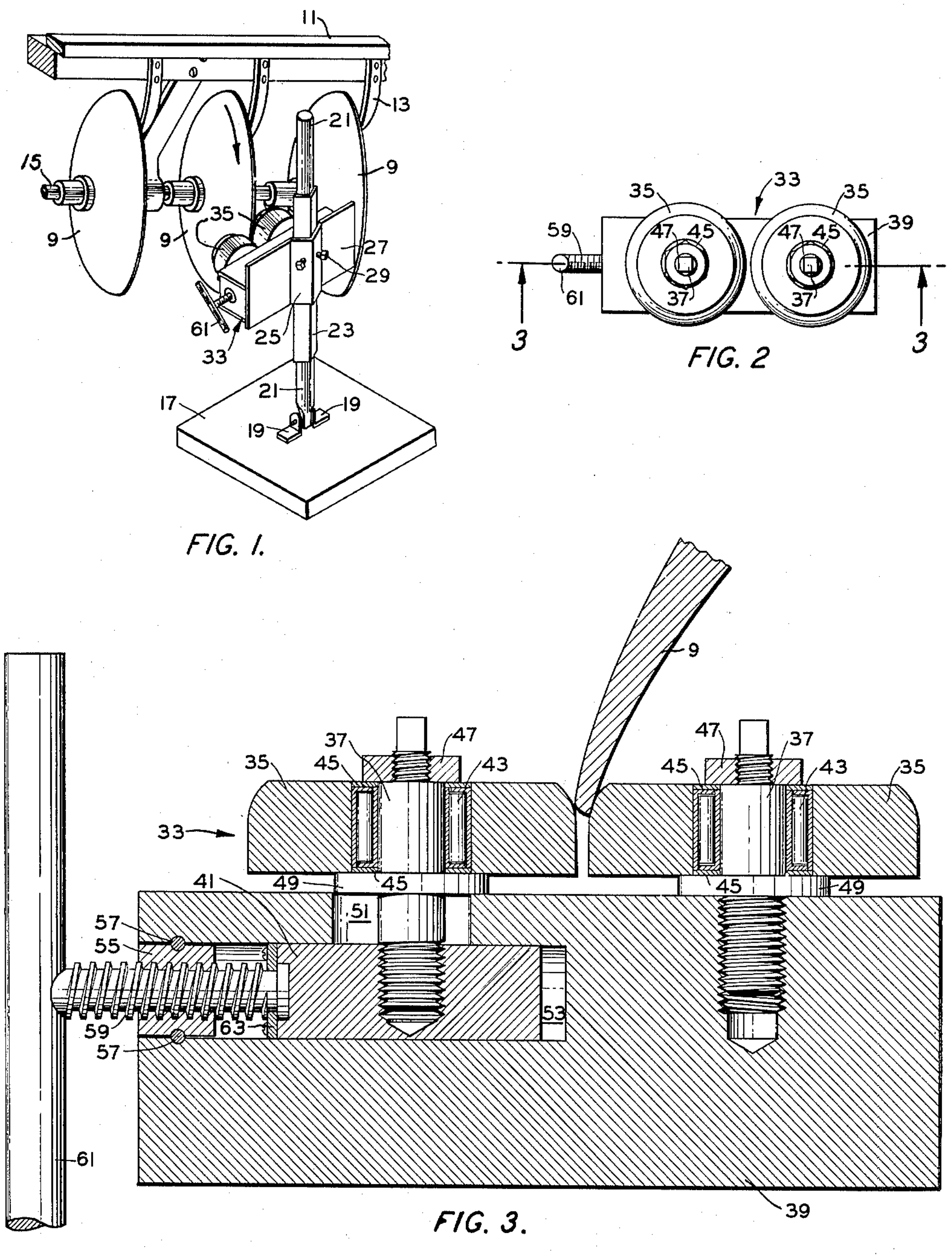
Fig. 1 is a perspective view showing a preferred specific embodiment of the disk sharpening apparatus of our invention near operative position for sharpening a disk of a disk tiller.
Fig. 2 is an elevation view of a preferred specific embodiment of the disk sharpening apparatus of our invention, comprising adjustable swaging rollers mounted on a rigid carriage, the apparatus shown pivotally mounted for the sharpening operation in Fig. 1.
Fig. 3 is a cross sectional view taken on line 3—3 of Fig. 2 showing a portion of a dull disk in position to be sharpened.

The following disclosure and discussion of the apparatus of our invention is made with reference to the drawings. The same reference numerals appear on the drawings to indicate like or similar parts or structure. However, it is to be understood that such disclosure and discussion is not to unduly limit the scope of our invention.

In Fig. 1, a portion of the disks 9 of a disk tiller, namely three, are mounted from frame member 11 having support members 13 therewith. The disks are secured to an axle 15 so that the disks rotate in unison along with the axle. The sharpening apparatus of our invention has a base member 17 which can be of any suitable shape, preferably that shape shown. An upright member is pivotally mounted between brackets 19 which are attached to base member 17 in any suitable manner, welding them to base member 17 being convenient and preferable. The upright member consists of members 21, which can be of any desired shape, such as tubular as shown, connected by angle iron 23. A frame or holding assembly is mounted on angle iron 23. The frame assembly has angle iron 25 attached in a suitable manner to a rear plate 27, angle iron 25 fitting down over angle iron 23 as shown in Fig. 1, and being held in a desired position thereon by set screws 29. A pair of parallel holding members 31 are attached to back member 27 and receive and hold the disk sharpening apparatus 33 having adjustable rollers 35 of our invention. The disk 9 is rotated clockwise as viewed in Fig. 1, that is, so that disk 9 passes downward between the rollers 35, and with the outer portion of the disk between rollers 35, which are held in contact with the disk by exerting force on upper member 21 which serves as an operating handle. Disks 9 are rotated in any suitable manner. Since the usual disk tiller has disks 9 rigidly mounted on axle 15 to turn therewith, the disks can conveniently be rotated by turning axle 15. We have found that a tractor through its power take-off furnishes a ready source of power to turn disks 9.

Rollers 35 are mounted on axles 37. One of the axles 37 is stationarily mounted by threadedly securing same to carriage 39. The other axles 37 is slidably mounted on carriage 39 by threadedly securing same to a mounting member 41 which is slidably mounted in carriage 39. Rollers 35 are mounted on axles or spindles 37 using roller bearings 43, washers 45 on each end of the roller bearings and nuts 47 on an outer threaded portion of axles 37. The outer ends of axles 37 are shaped to receive a wrench for securing the axles to members 39 and 41, or for removing them therefrom. Axles 37 have shoulders 49 which seat up against carriage 39 and space rollers 35 therefrom. The threaded hole in member 41 is threaded deep enough to receive axle 37 to a depth when turned tight so that shoulder 49 will slide relatively easily on the face of carriage 39. Rollers 35 are preferably convex on their outer edges and right angular on their inner edges as shown, the outer curved edge being found very desirable and giving excellent results in rolling out the edges of disks 9 to sharpen same. Axle 37 mounted in member 41 projects through an opening 51 in carriage 39. Member 41 is slidably mounted in a hole 53 entering carriage 39 from the end. A retaining member 55 is held in the outer portion of hole 53 by pins 57. Removal of pins 57 allows for easy removal of member 55. An adjusting screw 59 having a handle 61 is threadedly mounted in member 55 and rotatably attached to member 41 by ring 63 secured to member 41, so that when the adjusting screw is turned member 41 will slide in hole 53 and move rollers 35 together or apart depending on the direction in which screw 59 is turned. Thus, the distance between the rollers can be varied as desired, to regulate the force exerted on disk 9 by rollers 35 and the degree to which disk 9 is rolled out to sharpen same. We have found it desirable in sharpening disk 9 to start the operation with the dull disk in substantially the position shown in Fig. 3, and decrease the distance between rollers 35 as the edge of the disk is rolled out by exerting force on upper member 21 to force the rollers onto the rotating disk. If desired, disk 9 can be sharpened by starting with the rollers 35 in on the disk toward the center, and as the disk is rolled out, withdraw the rollers while decreasing the distance therebetween. Construction of the type shown in Fig. 3 has been found very adequate to withstand the thrust resulting from rolling out a disk from one that is very dull to one that is of optimum sharpness.

Figures 4, 5, 6, 7:
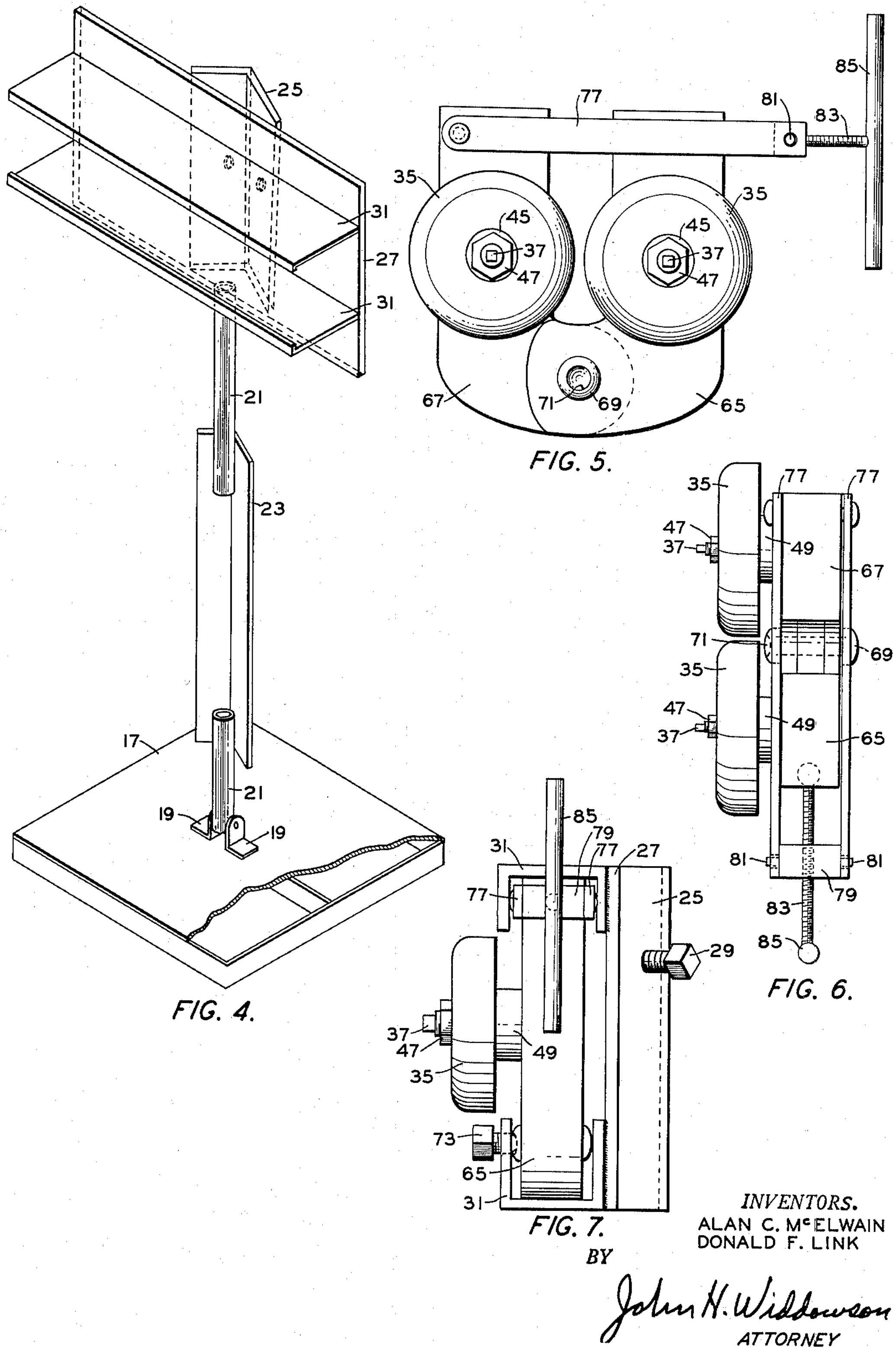
Fig. 4 is a perspective exploded view of a preferred mounting means for the apparatus shown in Fig. 2, the combination assembly being depicted in Fig. 1.
Fig. 5 is an elevation view of another preferred specific embodiment of the disk sharpening apparatus of our invention, embodying a pivotally connected carriage.
Fig. 6 is a top view of the apparatus shown in Fig. 5.
Fig. 7 is a side elevation view of the apparatus shown in Figs. 5 and 6 mounted in a frame which in turn is mountable on a base and upright assembly like or similar to that shown in Figs. 1 and 4.

In Figs. 5, 6 and 7, another preferred specific embodiment of the disk sharpening means of our invention is shown. In this embodiment rollers 35 are mounted on a carriage which is pivotally connected between the rollers. Member 65 of the carriage has a yoke in which member 67 is pivotally mounted by pin 69. Pin 69 has a cup 71 in its outer end to receive the end of a set screw 73. Arms 77 are pivotally connected to the upper end portion of member 67, one on each of the front and back of member 67. Between the other end portion of arms 77 is connected a member 79 which is pivoted by pins 81 in holes in each of arms 77. An adjusting screw 83 having a handle 85 is threadedly mounted in member 79. The inner end of member 83 is pivotally connected, preferably by a ball and socket connection to member 65. Rollers 35 are mounted on carriage members 65 and 67 in the same manner as they are mounted on rigid carriage 39, portion 49 of axle or spindle 37 spacing rollers 35 from members 65 and 67.

The carriage assembly with rollers thereon is adjustable with regard to distance between rollers 35 by turning adjusting screw 83 with handle 85. The whole assembly is preferably removably mounted in a frame or holding member similar to that preferred for rigid carriage 39. This mounting means for the pivotally connected carriage is shown in Fig. 7 and has parallel holding members 31 mounted on a back member 27. The lip of lower member 31 has a set screw 73 therein, the end of which is inserted into the cup 71 when the whole assembly is mounted between the bracket members 31. The assembly is desirably free to move slightly around the pivot point established by set screw 73. An angle iron member 25 attached to member 27 and having a set screw 29 therewith is provided for adjustably mounting the assembly on upright member 23. This specific embodiment of the apparatus of our invention is used in the same manner as that depicted in Figs. 1, 2 and 3. Disks 9 are sharpened by rotating the disks so that they pass downward between rollers 35 while they are contacted by rollers 35, force being exerted to keep rollers in contact with disks 9 by pushing on upper member 21 of the mounting means. The distance between rollers 35 is decreased as the outer portion of the disk 9 is rolled out by turning adjusting screw 83 in a direction to move members 65 and 57 together. The yoke means of pivotally connecting members 65 and 67, and the adjusting screw means shown, are preferred and strong in structure. However, other connection means and adjusting means can be used if desired.

As will be evident to those skilled in the art, various modifications of this invention can be made or followed in the light of this disclosure and discussion, without departing from the spirit or scope of the disclosure or from the scope of the claims.

We claim:

1. Apparatus for sharpening the disks of a disk tiller, which comprises, in combination, a rigid carriage bar, a first idle swaging roller which is roller-bearing and removably mounted on a first axle which is threadedly secured to said carriage bar on one end portion thereof, a second idle swaging roller which is roller-bearing and removably mounted on a second axle, a mounting member slidably mounted in the other end portion of said carriage bar, said second axle extending through an opening into said last-named end portion of said carriage bar and being threadedly secured to said mounting member, said rollers being convex on their outer edges, right angular on their inner edges and co-planarly mounted on said carriage bar, an adjusting screw threadedly mounted in said last-named end portion of said carriage bar, attached to said slidable mounting member and adapted upon turning to vary the distance between said rollers, a frame adapted to receive and hold said carriage bar, a base member, and a lever member pivotally attached to said base member and having a handle portion on its upper end portion, said lever member adapted to adjustably mount said frame with said rollers on said carriage bar in operative position.

2. Apparatus for sharpening the disks of a disk tiller, which comprises, in combination, a rigid carriage bar, a first idle swaging roller which is roller-bearing and removably mounted on a first axle which is threadedly secured to said carriage bar on one end portion thereof, a second idle swaging roller which is roller-bearing and removably mounted on a second axle, a mounting member slidably mounted in the other end portion of said carriage bar, said second axle extending through an opening into said last-named end portion of said carriage bar and being threadably secured to said mounting member, said rollers being convex on their outer edges, right angular on their inner edges and co-planarly mounted on said carriage bar, and an adjusting screw threadedly mounted in said last-named end portion of said carriage bar, attached to said slidable mounting member and adapted upon turning to vary the distance between said rollers.

3. Apparatus for sharpening the disks of a disk tiller, which comprises, in combination: a carriage pivotally connected in its middle portion; a first idle swaging roller which is roller-bearing and removably mounted on a first axle which is threadedly secured to said carriage on one end portion thereof, a second idle swaging roller which is roller-bearing and removably mounted on a second axle which is threadedly secured to said carriage on the opposite end portion thereof, said rollers being convex on their outer edges, right angular on their inner edges and co-planarly mounted on said carriage; arm members oppositely disposed and pivotally attached in one of their end portions to one end portion of said carriage and having a connecting member pivotally mounted between the other end portions thereof; an adjusting screw threadedly mounted in said connecting member, pivotally attached to the other end portion of said carriage and adapted upon turning to vary the distance between said rollers; a frame adapted to receive and hold said carriage bar; a base member; and a lever member pivotally attached to said base member and having a handle portion on its upper end portion, said lever member adapted to adjustably mount said frame with said rollers on said carriage in operative position.

4. Apparatus for sharpening the disks of a disk tiller, which comprises, in combination: a carriage pivotally connected in its middle portion; a first idle swaging roller which is roller-bearing and removably mounted on a first axle which is threadedly secured to said carriage on one end portion thereof, a second idle swaging roller which is roller-bearing and removably mounted on a second axle which is threadedly secured to said carriage on the opposite end portion thereof, said rollers being convex on their outer edges, right angular on their inner edges and coplanarly mounted on said carriage; arm members oppositely disposed and pivotally attached in one of their end portions to one end portion of said carriage and having a connecting member pivotally mounted between the other end portions thereof; and an adjusting screw threadedly mounted in said connecting member, pivotally attached to the other end portion of said carriage and adapted upon turning to vary the distance between said rollers.

5. Apparatus for sharpening the disks of a disk tiller, which comprises, in combination, a carriage pivotally connected in its middle portion, a first idle swaging roller mounted on an axle which is stationarily and unrotatably mounted on said carriage on one side of the point of carriage pivot, a second idle swaging roller mounted on an axle which is stationarily and unrotatably mounted on said carriage on the other side of said point of carriage pivot, said rollers being co-planarly mounted and positioned on said carriage to receive the outer portion of a disk of said disk tiller therebetween, said rollers having faces of such configuration that the distance between said faces decreases from front to rear over the working portion of said rollers and said rollers being adapted to roll out said outer portion of said disks of said disk tiller upon rotating said disks between said rollers, and adjusting means mounted on said carriage and operatively connected to said carriage on both sides of the point of carriage pivot adapted to vary the distance between said rollers and to fixedly maintain a desired distance between said rollers upon adjustment.

References Cited in the file of this patent

UNITED STATES PATENTS

| | | |
|---|---|---|
| 540,847 | Wenzelmann | June 11, 1895 |
| 580,385 | Durkee | Apr. 13, 1897 |
| 950,900 | Dow | Mar. 1, 1910 |
| 1,199,977 | Foley | Oct. 3, 1916 |
| 1,807,978 | Galvin | June 2, 1931 |
| 1,878,396 | Hawes | Sept. 20, 1932 |
| 1,912,166 | Skow | May 30, 1933 |
| 2,057,439 | Madsen | Oct. 13, 1936 |
| 2,533,009 | Harsh | Dec. 5, 1950 |
| 2,565,916 | Frusher | Aug. 28, 1951 |